(12) United States Patent
Chen et al.

(10) Patent No.: US 7,326,070 B2
(45) Date of Patent: Feb. 5, 2008

(54) MEMORY CARD CONNECTOR

(75) Inventors: Yen-Lin Chen, Banqiao (TW); Yi-Sheng Lin, Banqiao (TW)

(73) Assignee: ITW Tech. Co., Ltd., Taipei County (TW)

( * ) Notice: Subject to any disclaimer, the term of this patent is extended or adjusted under 35 U.S.C. 154(b) by 0 days.

(21) Appl. No.: 11/491,257

(22) Filed: Jul. 24, 2006

(65) Prior Publication Data

US 2007/0042622 A1 Feb. 22, 2007

(30) Foreign Application Priority Data

Jul. 19, 2005 (TW) .............................. 94212207 U
Apr. 26, 2006 (TW) .............................. 95207141 U

(51) Int. Cl.
*H01R 13/62* (2006.01)
(52) U.S. Cl. ..................................................... 439/159
(58) Field of Classification Search ................. 439/159
See application file for complete search history.

(56) References Cited

U.S. PATENT DOCUMENTS 5,575,669 A * 11/1996 Lin et al. .................... 439/157
6,095,835 A * 8/2000 Oguchi ........................ 439/159
6,109,941 A * 8/2000 Koseki et al. ............... 439/159
6,585,542 B2 * 7/2003 Nishio et al. ................ 439/630
6,843,670 B2 * 1/2005 Yamaguchi et al. ......... 439/159
7,118,395 B2 * 10/2006 Tsuji ........................... 439/159

* cited by examiner

*Primary Examiner*—James R. Harvey
*Assistant Examiner*—Travis Chambers
(74) *Attorney, Agent, or Firm*—Troxell Law Office, PLLC

(57) ABSTRACT

A memory card connector has an insulative frame receiving conductive terminals therein, a slide guiding mechanism assembled on the insulative frame, and a shell. The slide guiding mechanism includes a sliding bar, a guiding bar, and a resilient element. The sliding bar defines a guiding groove. A link portion is formed on an end of the sliding bar. A driving member is arranged at an end of the sliding bar and opposite the link portion, and has a pushing portion and a drawing portion. A driven member has a pushed portion and a drawn portion. The driven member cooperates with a stop member to control stopping of a member card. The slide guiding mechanism further includes a first conductor and a second conductor respectively communicating with ends of a detecting circuit of a circuit system for detecting ejection of the memory card at the earliest time.

16 Claims, 9 Drawing Sheets

MEMORY CARD CONNECTOR

BACKGROUND OF THE INVENTION

1. Field of the Invention

The present invention relates to a memory card connector, and particularly to a memory card connector which guards from accidental ejection of a memory card and which detects at the earliest time when the memory card is ejected for providing sufficient time to protect the processed data and avoiding harm to the memory card, thereby assuring stable signal transference.

2. Related Art

A memory card connector of Push-Push type includes an insulated housing with conductive terminals therein, an ejector assembled on the insulated housing for guiding insertion or ejection of the memory card, and a shell shrouding the insulated housing. The ejector guides the memory card inserted or ejected, but can not position and fix the memory card after insertion. In other words, the inserted memory card is apt to be ejected when suffering from external force in reverse direction of insertion, which often impacts signal transference and damages the conductive terminals.

Furthermore, under undesired condition, excessive shock may rock and deflect the memory card, resulting in unreliable connection with the conductive terminals and therefore unstable signal transference. Once host system detects that the memory card tends to eject, the period before the conductive terminals of the memory card departing from a golden finger is too short to store the processed data, forcing the processed data to be lost. Namely, the period from the point that system detects ejection of the memory card to the point that the conductive terminals departs from the golden finger is too short, and thus the memory card is ejected before any measure to store the processed data is executed. Accordingly, users or others touching the memory card mistakenly will lose the processed data. Words like that, memory card is prohibited to be ejected during data is written or read, is usually noted in user specifications of memory card for forestalling loss of the processed data, whereas this note can not obviate this defect in substance.

SUMMARY OF THE INVENTION

Accordingly, an object of the present invention is to provide a memory card connector which positions and fixes an inserted memory card, avoiding the memory card to be ejected by an external force in reverse direction of insertion when working and to be deflected or rocked by inappropriate shock, thereby ensuring stable signal transference.

Another object of the present invention is to provide a memory card connector which detects ejection of the memory card at the earliest time, providing enough time for a circuit system to protect the processed data before a golden finger of the memory card departing from conductive terminals, thereby preventing loss of the processed data and damage of the memory card.

To meet the objects, the memory card connector of the present invention comprises an insulative frame receiving conductive terminals therein, a slide guiding mechanism assembled on the insulative frame.

The slide guiding mechanism includes a sliding bar, a guiding bar, and a resilient element for providing return force for the sliding bar. The sliding bar defines a guiding groove which has insertion course and ejection course respectively for guiding insertion and ejection of a memory card. A link portion is formed on an end of the sliding bar. The guiding bar has a second guiding end retained on insulative frame, and a first guiding end moving relative to the guiding groove with the sliding bar. A driving member is arranged at an end of the sliding bar and far away from the link portion, and has a pushing portion and a drawing portion. A driven member corresponds to the driving member and has a pushed portion and a drawn portion. The driven member cooperates with a stop member to control stopping of the memory card. The sliding bar moves along the insertion/ejection course and displaces with respect to the driven member. In detail, insertion course of the guiding groove makes the drawing portion of the drive member drive the drawn portion of the driven member, allowing insertion of the memory card and abutting against the memory card for ensuring the memory card on working state. Ejection course of the guiding groove makes the pushing portion of the drive member drive the pushed portion of the driven member, releasing and ejecting the memory card.

The slide guiding mechanism further includes a first conductor and a second conductor. The first conductor includes a contact arm received in the insulative frame, and a soldering arm communicating with an end of a detecting circuit of the circuit system. The second conductor is provided on the sliding bar, and includes a first contact portion and a second contact portion. The first contact portion is located at the positioning portion of the guiding groove. The second conductor contacts or departs from the contact arm of the first conductor along with movement of the sliding bar. The guiding bar has a second guiding end retained on the insulative frame and communicating with another end of the detecting circuit of the circuit system, and a first guiding end moving relative to the guiding groove with the sliding bar. A shell communicates with an end of the detecting circuit of the circuit system. The first contact portion of the second conductor contacts the first guiding end of the guiding bar at the positioning portion of the guiding groove. At the earliest time of starting ejection of the memory card, the guiding bar departs from the first contact portion of the second conductor, the circuit system forms disconnected, when ejection of the memory card is detected.

DESCRIPTION OF THE PREFERRED EMBODIMENTS

Figure 1:
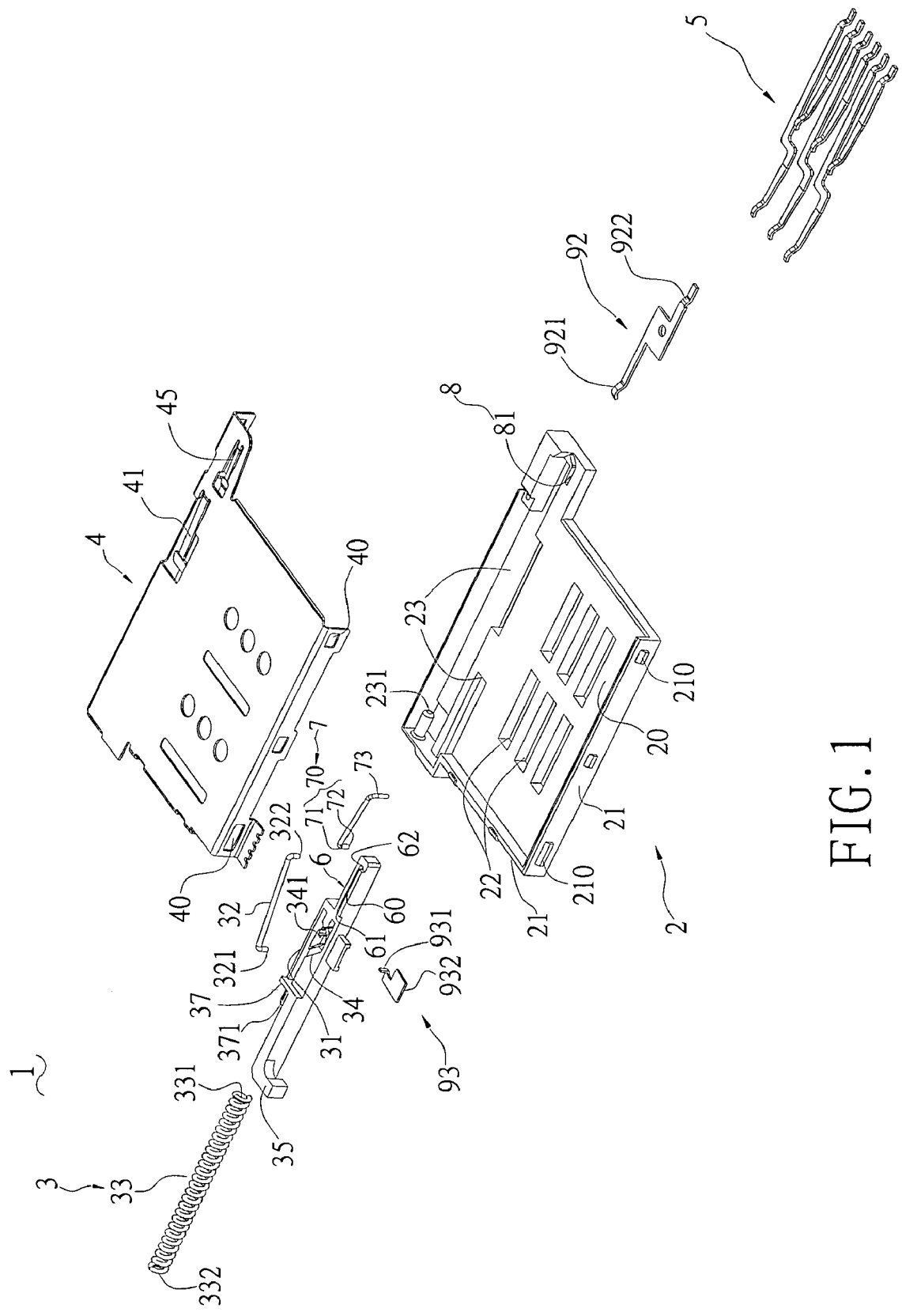
FIG. 1 is an exploded view of a memory card connector of the present invention.
Figure 2:
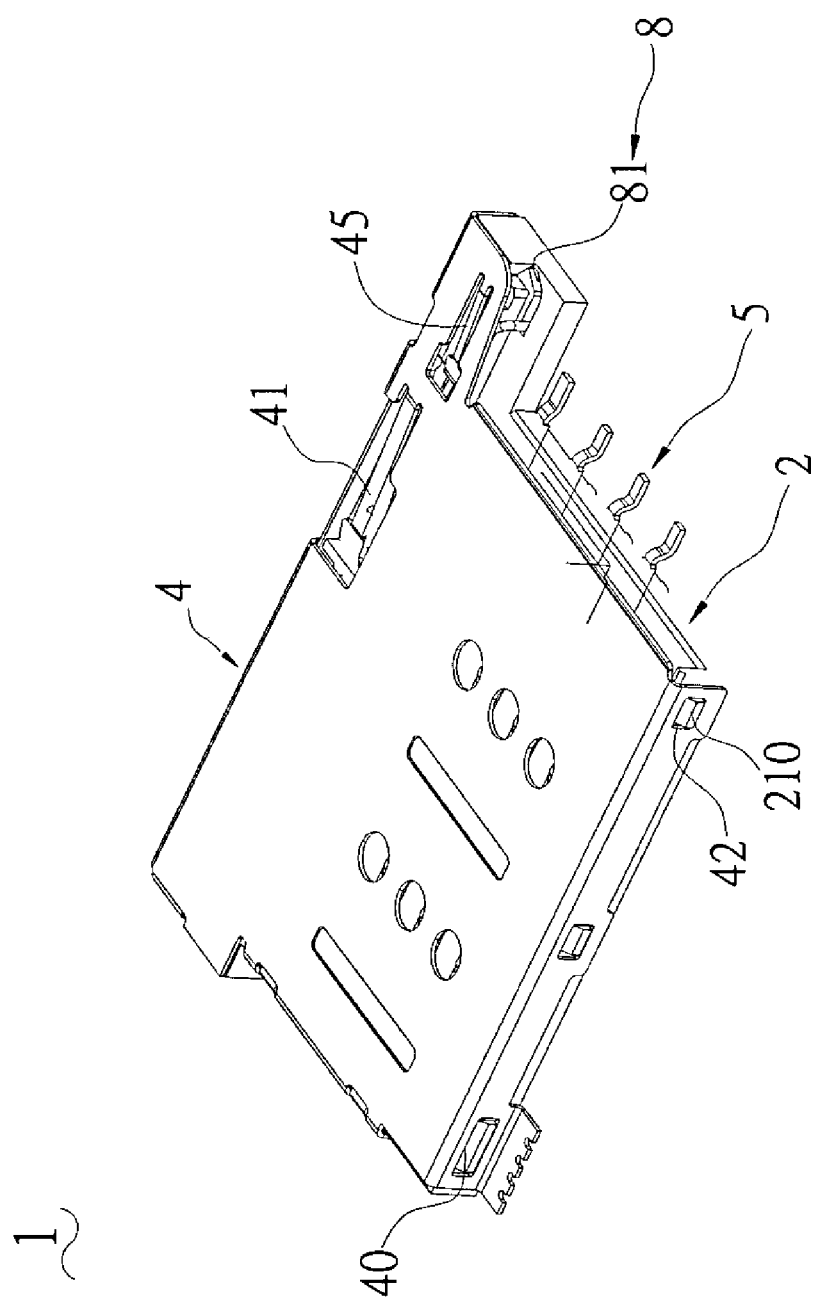
FIG. 2 is an assembled view of the memory card connector of FIG. 1.
Figure 3:
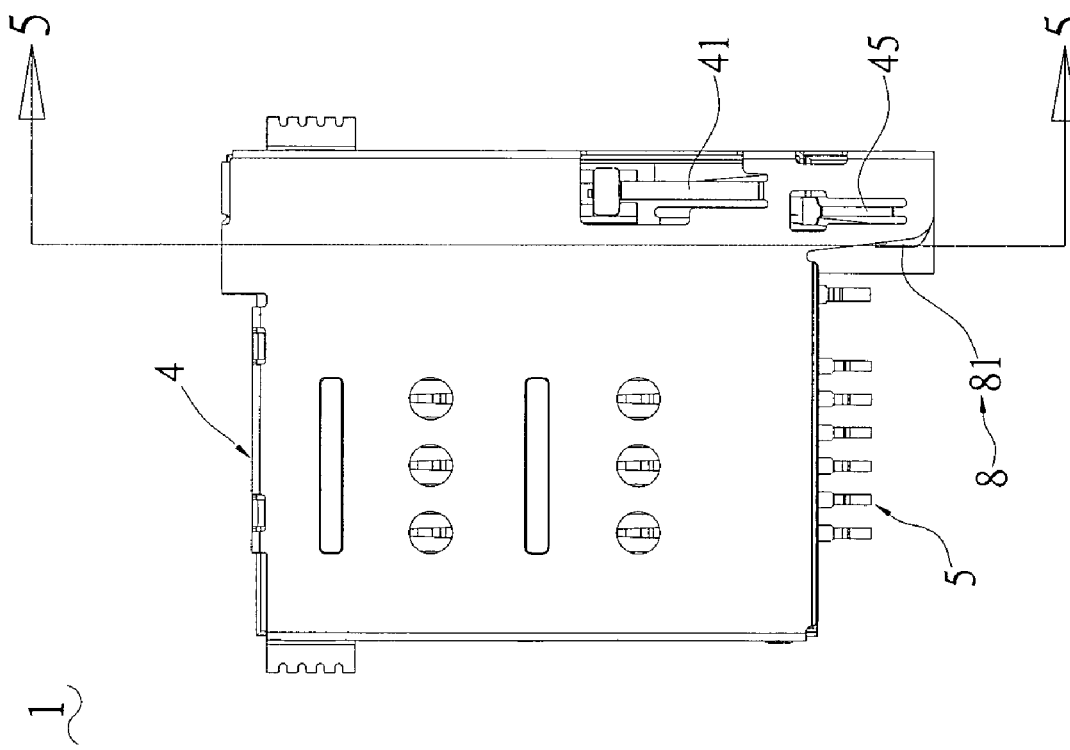
FIG. 3 is a top view of the memory card connector of FIG. 2.

With reference to FIGS. 1 through 4, a memory card connector 1 in accordance with the present invention is used to communicate with a circuit system for signal transference between a memory card and a main board, and comprises an insulative frame 2, a slide guiding mechanism 3, a shell 4, conductive terminals 5, a driving member 6, a driven member 7, a stop member 8, a first conductor 92 and a second conductor 93. The insulative frame 2 includes a housing 20 and lateral sides 21. A plurality of passageways 22 is defined in the housing 20 for receiving the conductive terminals 5 by integral shaping. An assembling groove 23 is defined adjacent a side of the housing 20 for assembling the slide guiding mechanism 3 thereon. A post 231 is formed in the assembling groove 23. Buttons 210 are projected on the lateral sides 21 for assembling the shell 4.

The slide guiding mechanism 3 is assembled on the assembling groove 23 and includes a sliding bar 31, a guiding bar 32 and a resilient element 33. The sliding bar 31 defines a heart-like guiding groove 34 which has insertion course and ejection course respectively for guiding insertion course and ejection of a memory card 9 (shown in FIGS. 6A-6E). A positioning portion 341 is recessed in the guiding groove 34 for obtaining working state of the memory card 9. A link portion 35 is formed on an end of the sliding bar 31, and a biasing portion 37 is defined on another end of the sliding bar 31 and adjacent to the guiding groove 34. A pillar 371 is formed on the biasing portion 37. The guiding bar 32 includes a first guiding end 321 and a second guiding end 322 respectively bending at substantial 90 degree from a base (not shown) thereof. The first guiding end 321 moves relative to the insertion/ejection course of the guiding groove 34 with movement of the sliding bar 31. The second guiding end 322 is retained on an axis hole 211 (shown in FIG. 4) of a lateral side 211 and communicates with an end of a detecting circuit of a circuit system (not shown).

The resilient element 33 is a compressed spring, and is mounted on the sliding bar 31 and close to the link portion 35. The resilient element 33 has a first resilient end 331 mounted around the pillar 371 and biasing against the biasing portion 37 of the sliding bar 31, and a second resilient end 332 opposite the first resilient end 331 and mounted around the post 231 in the assembling groove 23 for proving return force of the sliding bar 31.

Figure 8:
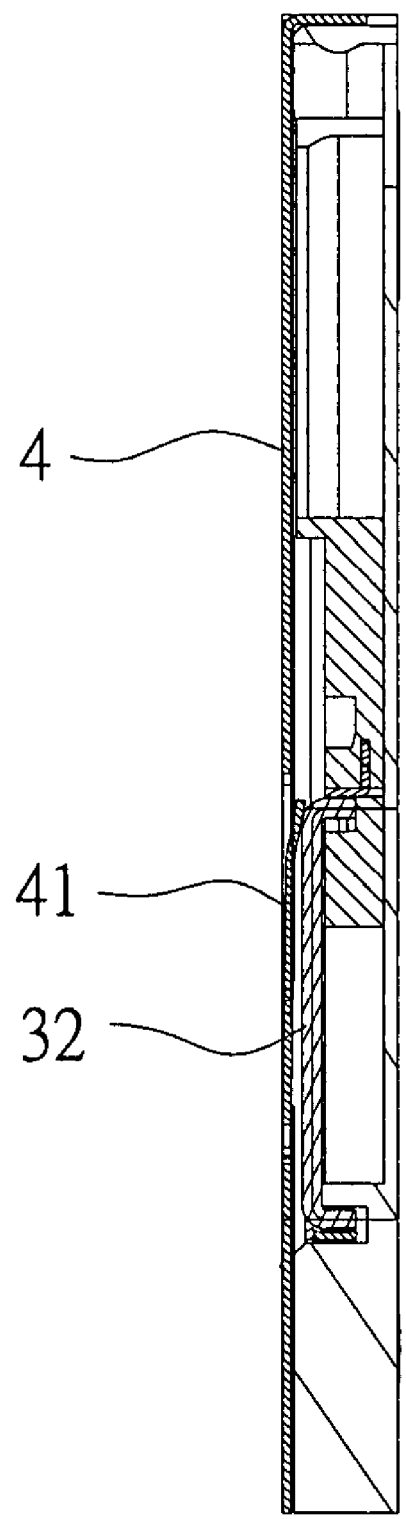
FIG. 8 is a cross-sectional view in line with the memory card of another embodiment of the present invention.

The shell 4 is made of metal and communicates with an end of a detecting circuit of a circuit system (not shown). Latching grooves 40 are defined in the shell 4 for corresponding to the buttons 210, whereby the shell 4 envelops the insulative frame 2. A stop sheet 41 is formed on a surface of the shell 4 for abutting against the guiding bar 32, as shown in FIG. 8. A stop plate 45 is formed on the shell 4 for abutting against the driven member 7. Soldering tails 42 extend and bend from corners of the shell 4 for surface mounting.

The driving member 6 is arranged at an end of the sliding bar 31 and opposite the link portion 35, and includes an extending arm integrated with the sliding bar 31. An oval first link groove 60 is defined in the extending arm, and has a pushing portion 61 at a side thereof and a drawing portion 62 at another side thereof. Length of the pushing portion 61 and the drawing portion 62 is shorter than or equal to that of the insertion/ejection course of the memory card 9.

The driven member 7 is a wire and extends into the first link groove 60. The driven member 7 has a driven end 70 bending generally at 90 degree for extending into the first link groove 60. The driven end 70 has a pushed portion 71 at a side thereof and a drawn portion 72 at another side thereof. A free end 73 of the driven member 7 is located opposite the driven end 70, offsetting and bending approximately at 90 degree.

The stop member 8 is a second link groove, which includes a straight section 80 and an arc section 81 for allowing the free end 73 of the driven member 7 extending therein. Along with action of the pushed portion 71 and the drawn portion 72, the free end 73 along the straight section 80 and the arc section 81 controls stopping of the memory card 9.

The first conductor 92 includes a contact arm 921 and a soldering arm 922. The contact arm 921 corresponds to the soldering arm 922 and is cantilevered in the assembling groove 23. The soldering arm 922 bends for surface mounting and communicates with another end of the detecting circuit of the circuit system.

The second conductor 93 is provided on the sliding bar 31, and includes a first contact portion 931 and a second contact portion 932. The first contact portion 931 bends approximately at 90 degree for inserting into the positioning portion 341 of the guiding groove 34, and contacts the first guiding end 321 of the guiding bar 32 at the positioning portion 341. The second contact portion 932 is generally planar, and contacts or departs from the contact arm 921 of the first conductor 92 with movement of the sliding bar 31. The sliding bar 32 defines a slot (not labeled) adjacent the guiding groove 34 for assembling the second contact portion 932 of the second conductor 93.

Figure 4:
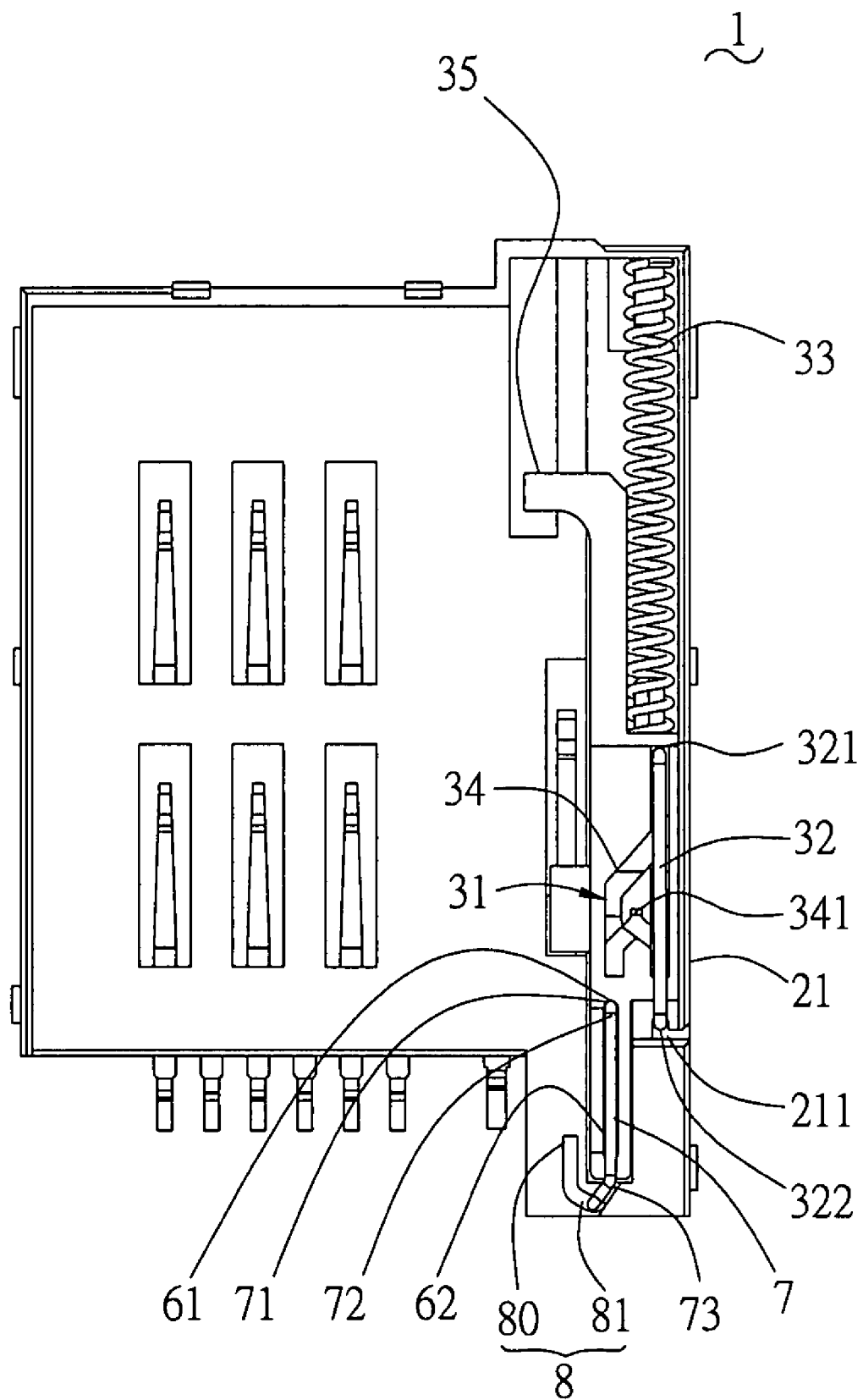
FIG. 4 is a top view of the assembled memory card connector of the present invention, wherein a shell thereof is removed.

Referring to FIG. 4, the shell 4 is removed for clearly showing the slide guiding mechanism 3. The first guiding end 321 of the guiding bar 32 moves along the insertion/ejection course of the guiding groove 34 during the guiding bar 31 slides, whereby the sliding bar 31 positions and controls the insertion/ejection of the memory card 9. With the pushing portion 61 and the drawing portion 62 displacing, the driven portion 71 and the drawn portion 72 drive the free end 73 to move and offset with respect to the straight section 80 and the arc section 81 of the stop member 8.

Figure 6:
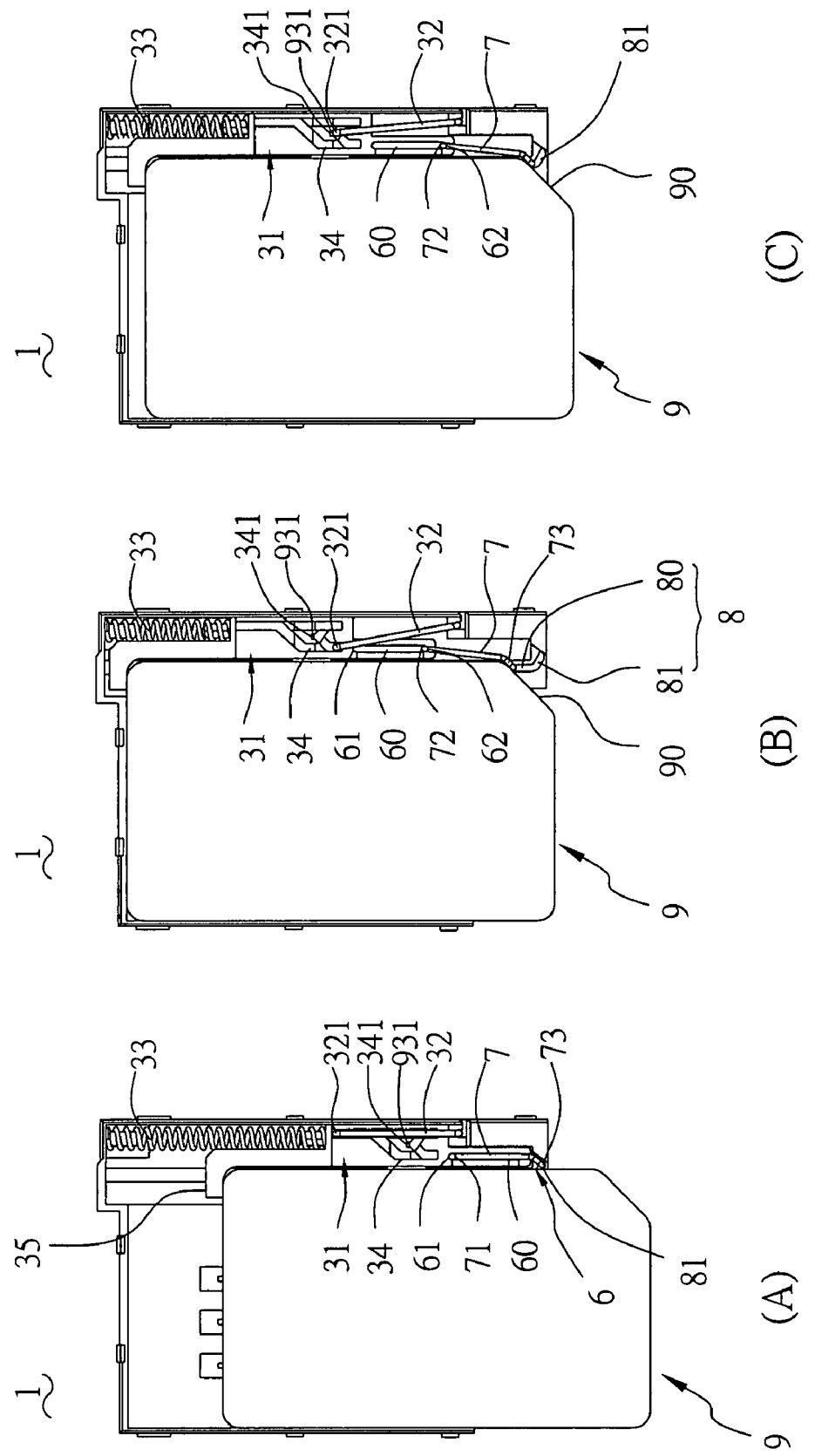
FIGS. 6A-6E schematically illustrate a memory card is inserted and ejected from the memory card connector of the present invention.
Figure 6:
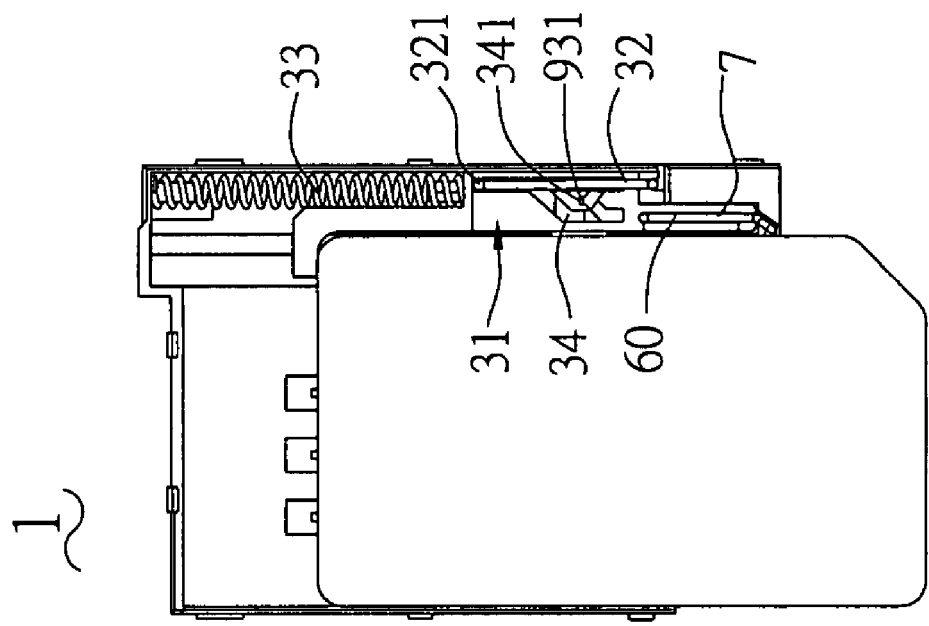
Figure 6:
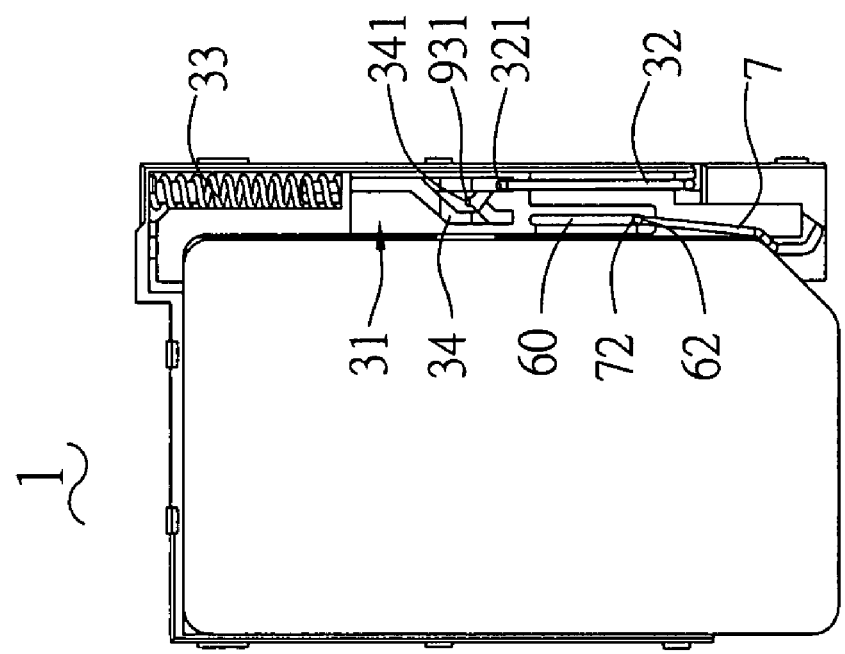

As shown in FIG. 6A, the memory card 9 is inserted in the memory card connector 1 of the instant invention. A forward edge of the memory card 9 abuts against the link portion 35, and the sliding bar 31 is pushed. When the memory card 9 arrives at a final position, as shown in FIG. 6B, the first guiding end 321 of the guiding bar 32 displaces along the insertion course of the guiding groove 34 with sliding of the sliding bar 31. Meanwhile the drawing portion 62 of the driving member 6 draws the drawn portion 72 of the driven member 7, making the driven member 7 displace with the sliding bar 31. While at this time, the resilient member 33 is compressed, and therefore preserves energy. The free end 73 of the driven member 7 moves and offsets along the arc section 81 and the straight section 80, and finally biases against a cutout 90 of the memory card 9.

In the event of removing force exerted on the memory card 9, as shown in FIG. 6C, the resilient element 33 releases stored energy, urging the first guiding end 321 of the guiding bar 32 to stay at the positioning portion 341 of the guiding groove 34. The memory card 9 is on working state, while the free end 73 of the driven member 7 still biases against the cutout 90 of the memory card 9. Meantime the memory card 9 cannot be ejected in a reverse direction of insertion by external force, thereby ensuring reliable signal transference during the working state of the memory card 9. In order to eject the memory card 9, as shown in FIG. 6D, the memory card 9 is pushed to press a final position. Meantime the first guiding end 321 of the guiding bar 32 disengages from the positioning portion 341 of the guiding bar 34. The resilient element 33 is compressed and possesses energy. In the case that the memory card 9 is released, the resilient element 33 releases energy, pushing the sliding bar 31 and driving the link portion 35 to eject the memory card 9 out. The first guiding end 321 of the guiding bar 32 moves with the sliding bar 31 and displaces along the ejection course of the guiding groove 34. Whilst the pushing portion 61 of the driving member 6 pushes the pushed portion 71 of the driven member 7, making the driven member 7 displace with the sliding bar 31. The free end 73 of the driven member 7 is further driven to move and offset along the straight section 80 and the arc section 81 of the stop member 8, disengaging from the cutout 90 of the memory card 9, as shown in FIG. 6E, and at last restores no card state.

The driving member 6, the driven member 7 and the stop member 8 cooperate with the insertion and ejection of the slide guiding mechanism 3, effectively abutting against the memory card 9, thereby guarding from ejection by external force in reverse direction of insertion. Additionally, the memory card 9 is prevented from rocking and deflecting, thereby assuring stable signal transference.

Figure 5:
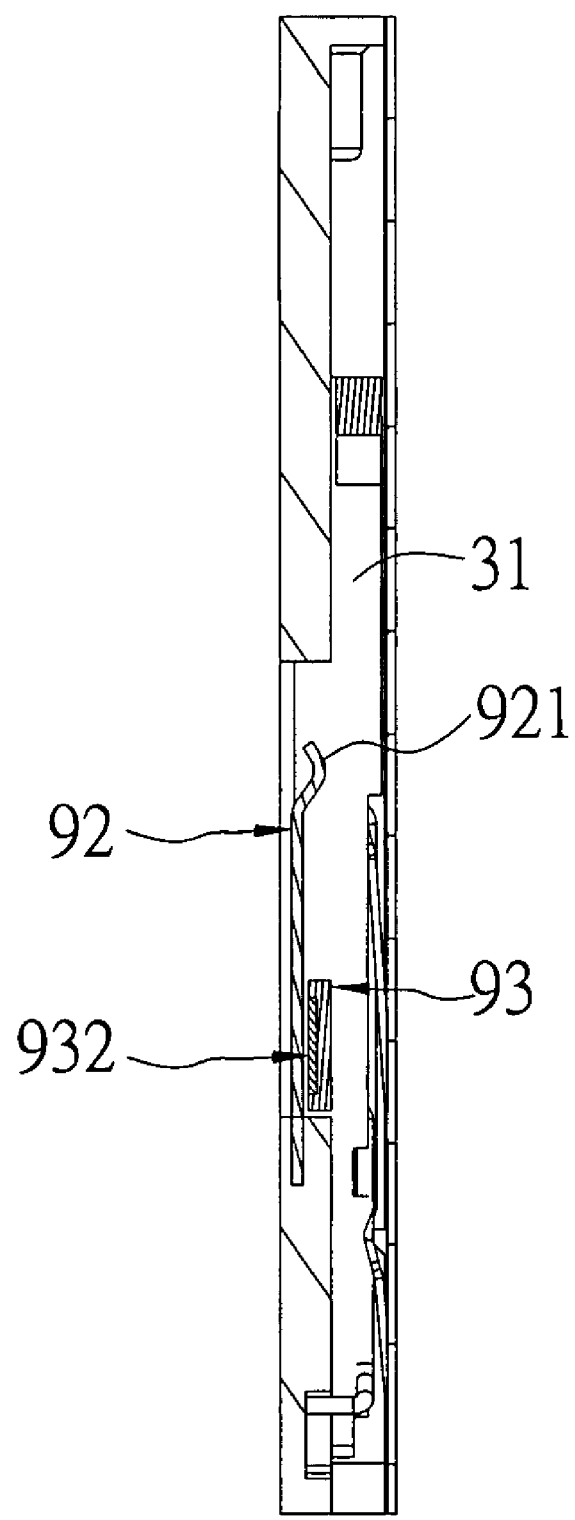
FIG. 5 is a cross-sectional view taken along the line 5-5 in FIG. 3.
Figure 7:
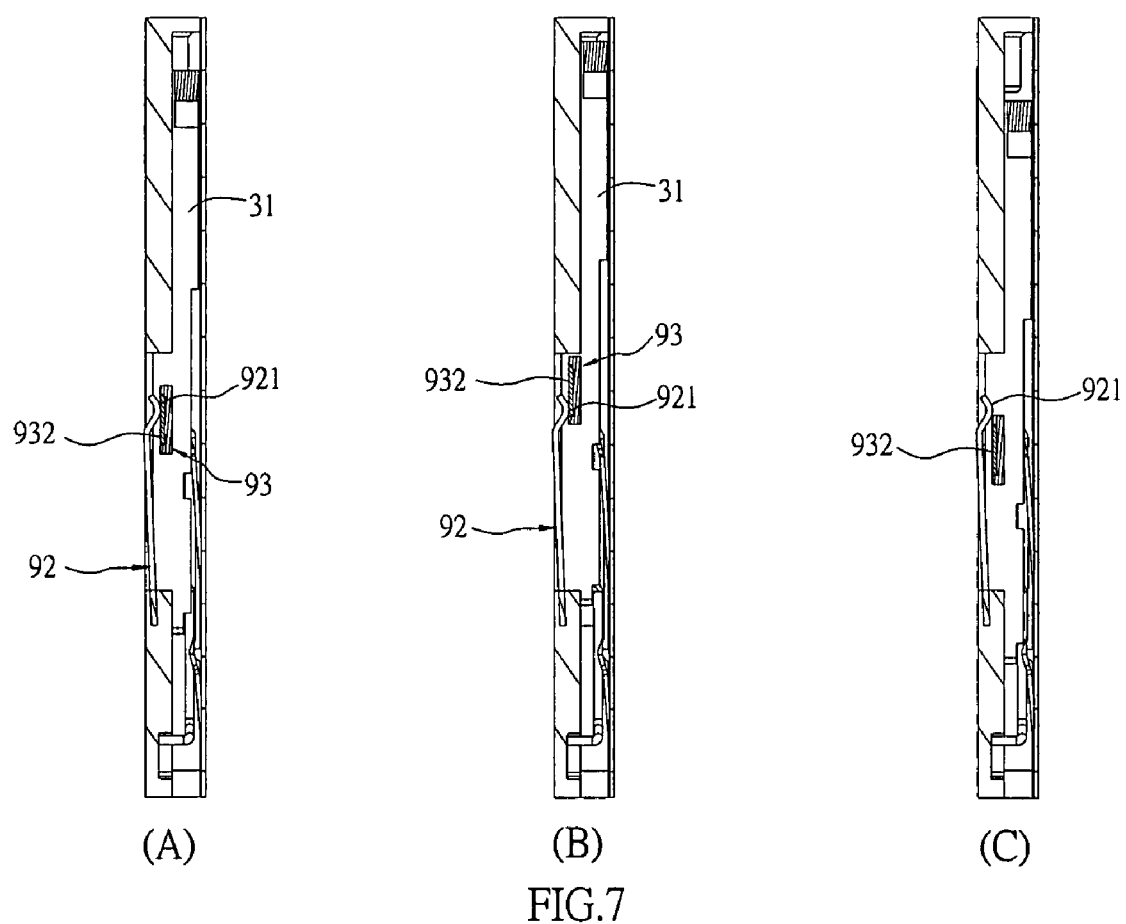
FIGS. 7A-7C schematically illustrate a second conductor of the memory card connector moves with a sliding bar for engaging to or disengaging from a first conductor.

FIGS. 5, 6A-6E and 7A-7C further illustrate the present invention. Referring to FIG. 5, the contact arm 921 of the first conductor 92 is apart from the second contact portion 932 of the second conductor 93 before insertion of the memory card 9. In case that the memory card 9 is inserted, referring to FIG. 6A, the second contact portion 932 contacts the contact portion 921 with movement of the sliding bar 31 (referring to FIG. 7A). Referring to FIG. 6C, the first guiding end 321 of the guiding bar 32 contacts the first contact portion 931 of the second conductor 93. The guiding bar 32 contacts the stop sheet 41 of the shell 4. Two ends of the detecting circuit communicate with each other, and the memory card 9 is on working state. In the case of ejecting the memory card 9, as shown in FIG. 6D, the memory card 9 is pushed to a final position, the first guiding end 321 of the guiding bar 32 disengaging from the first contact portion 931 of the second conductor 93. The detecting circuit forms disconnected, and thus detecting that a user is going to eject the memory card 9. This ejection message is informed to the circuit system in advance. At this time, the first conductor 92 does not disengage from the second conductor 93 entirely, as shown in FIG. 7B, and a golden finger of the memory card 9 does not entirely disengage from the conductive terminals 3 of the memory card connector 1, yet. Hence, the memory card 9 has sufficient time to protect the processed data during ejection course, avoiding losing the processed data and damaging the memory card 9.

Notably, apart from application of detecting ejecting of the memory card 9 at the earliest time, the second conductor 93 is also applied to switch insertion positioning of the memory card 9 owing to cooperation of the first contact portion 931 and second contact portion 932 with the first guiding end 321 of the guiding bar 32 and the contact arm 921 of the first conductor 92. In other words, when the soldering arm 922 of the first conductor 92 connects with an associated circuit of the circuit system, the first guiding end 321 of the guiding bar 32 contacting or disengaging from the first contact portion 931 of the second conductor may switch insertion positioning of the memory card 9.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A memory card connector, adapted for signal transference between a memory card and a main board, comprising:
    an insulative frame having a housing and lateral sides, a plurality of passageways being defined in the housing and receiving conductive terminals therein, an assembling groove being defined in the housing;
    a slide guiding mechanism assembled on the assembling groove, including:
        a sliding bar and a guiding bar, the sliding bar defining a guiding groove which has insertion course and ejection course, a link portion being formed on an end of the sliding bar, the guiding bar having a second guiding end retained on the insulative frame, and a first guiding end moving relative to the guiding groove with the sliding bar; and
        a resilient element mounted on the sliding bar and close to the link portion for providing return force for the sliding bar;
    a driving member arranged at an end of the sliding bar and opposite the link portion and having a pushing portion and a drawing portion; and
    a driven member corresponding to the driving member and having a pushed portion and a drawn portion, the driven member cooperating with a stop member to control abutting against the memory card,
    wherein, when the memory card is located in a working state, the first guiding end of the guiding bar engages a positioning portion of the guiding groove, and a free end of the driven member engaging a cutout of the memory card, and
    wherein, when the memory card is located in a working state, a first conductor is electrically connected to a second conductor.

2. The memory card connector as claimed in claim 1, wherein the driving member includes an extending arm integrated with the sliding bar, an oval first link groove being defined in the extending arm, the pushing portion being located in a side of the first link groove, and the drawing portion being located in another side of the first link groove.

3. The memory card connector as claimed in claim 2, wherein the driven member is a wire, and wherein the driven member has a driven end bending generally at 90 degree for extending into the first link groove, the pushed portion being located on a side of the driven end and the drawn portion being located on another side of the driven end, and the free end opposite the driven end, offsetting and bending approximately at 90 degree.

4. The memory card connector as claimed in claim 3, wherein the stop member is a second link groove which is defined in the insulative frame and includes a straight section and an arc section for allowing the free end of the driven member extending therein in such a way that with movement of the pushed portion and the drawn portion of the driven member, the free end moving along the straight section and the arc section controls abutting against the memory card.

5. The memory card connector as claimed in claim 1, further comprising a shell assembled on a side of the insulative frame and shielding the housing, a stop sheet being formed on the shell for abutting against the guiding bar, and a stop plate being formed on the shell for abutting against the driven member.

6. The memory card connector as claimed in claim 1, wherein the guiding groove is heart-like, and wherein the positioning portion is recessed in the guiding groove for providing working state of the memory card.

7. A memory card connector, adapted to communicate with a circuit system for signal transference between a memory card and a main board, comprising:
    an insulative frame having a housing and lateral sides, a plurality of passageways being defined in the housing and receiving conductive terminals therein, an assembling groove being defined in the housing;
    a slide guiding mechanism assembled on the assembling groove, including:

a sliding bar and a guiding bar, the sliding bar defining a guiding groove which has insertion course and ejection course, a link portion being formed on an end of the sliding bar, the guiding bar having a second guiding end retained on the insulative frame and communicating with an end of a detecting circuit of the circuit system, and a first guiding end moving relative to the guiding groove with movement of the sliding bar; and a resilient element mounted on the sliding bar and close to the link portion for providing return force for the sliding bar;

a first conductor including a contact arm received in the assembling groove, and a soldering arm communicating with another end of the detecting circuit of the circuit system; and a second conductor provided on the sliding bar, and including a first contact portion and a second contact portion, the first contact portion being located at a positioning portion of the guiding groove and contacting the first guiding end of the guiding bar at the positioning portion, the second conductor contacting or departing from the contact arm of the first conductor with movement of the sliding bar, wherein, when the memory card is located in a working state, the first guiding end of the guiding bar engages the positioning portion of the guiding groove, and a free end of a driven member engaging a cutout of the memory card, and wherein, when the memory card is located in a working state, the first conductor is electrically connected to the second conductor.

8. The memory card connector as claimed in claim 7, wherein the soldering arm of the first conductor bends for surface mounting, and wherein the contact arm of the first conductor corresponds to the soldering arm and is cantilevered.

9. The memory card connector as claimed in claim 7, wherein the first contact portion of the second conductor bends approximately at 90 degree for inserting into the positioning portion of the guiding groove, and wherein the second contact portion of the second conductor is generally planar.

10. The memory card connector as claimed in claim 9, wherein the sliding bar defines a slot adjacent the guiding groove for assembling the second contact portion of the second conductor.

11. A memory card connector, adapted to communicate with a circuit system for signal transference between a memory card and a main board, comprising:

an insulative frame having a housing and lateral sides, a plurality of passageways being defined in the housing and receiving conductive terminals therein, an assembling groove and a stop member being defined in the housing;

a slide guiding mechanism assembled on the assembling groove, including:

a sliding bar defining a guiding groove which has insertion course and ejection course, a link portion being formed on an end of the sliding bar, a driving member being arranged at another end of the sliding bar and having a pushing portion and a drawing portion, a driven member corresponding to the driving member and having a pushed portion and a drawn portion, the driven member cooperating with the stop member to control abutting against the memory card;

a guiding bar having a second guiding end retained on the insulative frame, and a first guiding end moving relative to the guiding groove with the sliding bar; and a resilient element mounted on the sliding bar and close to the link portion for providing return force for the sliding bar;

a shell assembled on a side of the insulative frame for shielding the housing, and communicating with an end of the detecting circuit of the circuit system, a stop sheet being formed on the shell for abutting against the guiding bar; and a second conductor provided on the sliding bar, communicating with another end of the detecting circuit of the circuit system, and including a first contact portion at a positioning portion of the guiding groove, ejection of the memory card being detected when the guiding bar departs from the first contact portion with movement of the sliding bar, wherein, when the memory card is located in a working state, the first guiding end of the guiding bar engages the positioning portion of the guiding groove, and a free end of the driven member engaging a cutout of the memory card, and wherein, when the memory card is located in a working state, a first conductor is electrically connected to the second conductor.

12. The memory card connector as claimed in claim 11, wherein the driving member includes an extending arm integrated with the sliding bar, an oval first link groove being defined in the extending arm, the pushing portion being located in a side of the first link groove, and the drawing portion being located in another side of the first link groove, and wherein the driven member is a wire, and has a the driven end bending generally at 90 degree for extending into the first link groove, and the free end is located opposite the driven end and offsetting and bending approximately at 90 degree, the pushed portion being located on a side of the driven end, and the drawn portion being located on another side of the driven end.

13. The memory card connector as claimed in claim 12, wherein the stop member is a second link groove which is defined in the insulative frame and includes a straight section and an arc section for allowing the free end of the driven member extending therein in such a way that, with movement of the pushed portion and the drawn portion, the free end moving along the straight section and the arc section controls abutting against the memory card.

14. The memory card connector as claimed in claim 11, wherein the first contact portion of the second conductor bends approximately at 90 degree for inserting into the positioning portion of the guiding groove.

15. The memory card connector as claimed in claim 11, wherein the guiding groove is heart-like, and wherein the positioning portion is recessed in the guiding groove for providing working state of the memory card.

16. A memory card connector, adapted to communicate with a circuit system for signal transference between a memory card and a main board, comprising:

an insulative frame having a housing and lateral sides, a plurality of passageways being defined in the housing and receiving conductive terminals therein, an assembling groove being defined in the housing;

a slide guiding mechanism assembled on the assembling groove, including:

a sliding bar and a guiding bar, the sliding bar defining a guiding groove with insertion course and ejection course, a link portion being formed on an end of the sliding bar, the guiding bar having a second guiding end retained on the insulative frame, and a first guiding end moving relative to the guiding groove with the sliding bar; and a resilient element mounted on the sliding bar and close to the link portion for providing return force for the sliding bar;

a shell assembled on a side of the insulative frame for shielding the housing, and communicating with an end of a detecting circuit of the circuit system, at least a stop sheet being formed on the shell for abutting against the guiding bar; and a second conductor provided on the sliding bar, communicating with another end of the detecting circuit of the circuit system, and including a first contact portion at a positioning portion of the guiding groove, ejection of the memory card being detected when the guiding bar departs from the first contact portion with movement of the sliding bar, wherein, when the memory card is located in a working state, the first guiding end of the guiding bar engages the positioning portion of the guiding groove, and a free end of a driven member engaging a cutout of the memory card, and wherein, when the memory card is located in a working state, a first conductor is electrically connected to the second conductor.

* * * * *